United States Patent
Nozawa et al.

(10) Patent No.: US 12,099,218 B2
(45) Date of Patent: Sep. 24, 2024

(54) LOW REFLECTIVE FILM AND OPTICAL SENSING KIT USING THE SAME, AND LOW REFLECTIVE MOLDED PRODUCT

(71) Applicant: KIMOTO CO., LTD., Saitama (JP)

(72) Inventors: Kazuhiro Nozawa, Saitama (JP); Tsuyoshi Nagahama, Saitama (JP); Shuzo Tomizawa, Saitama (JP)

(73) Assignee: KIMOTO CO., LTD., Saitama (JP)

( * ) Notice: Subject to any disclaimer, the term of this patent is extended or adjusted under 35 U.S.C. 154(b) by 351 days.

(21) Appl. No.: 17/598,935

(22) PCT Filed: Mar. 6, 2020

(86) PCT No.: PCT/JP2020/009573
§ 371 (c)(1),
(2) Date: Sep. 28, 2021

(87) PCT Pub. No.: WO2020/195693
PCT Pub. Date: Oct. 1, 2020

(65) Prior Publication Data
US 2022/0171104 A1    Jun. 2, 2022

(30) Foreign Application Priority Data
Mar. 28, 2019    (JP) ................ 2019-063509

(51) Int. Cl.
*G02B 5/08*    (2006.01)
*B32B 7/12*    (2006.01)
(Continued)

(52) U.S. Cl.
CPC .............. *G02B 5/0808* (2013.01); *B32B 7/12* (2013.01); *B32B 27/20* (2013.01); *C08L 33/08* (2013.01);
(Continued)

(58) Field of Classification Search
CPC ..... B32B 2307/408; B32B 27/20; B32B 7/12; C08L 2203/16; C08L 2205/025;
(Continued)

(56) References Cited

U.S. PATENT DOCUMENTS 6,110,595 A      8/2000  Suzuki et al.
9,371,467 B2 *   6/2016  Ishida ................. C09D 201/00
10,816,939 B1 * 10/2020  Coleman ................ G01S 17/86
(Continued)

FOREIGN PATENT DOCUMENTS

JP          06057007 A     3/1994
JP         H07314519 A    12/1995
(Continued)

OTHER PUBLICATIONS

International Search Report in corresponding PCT Application No. PCT/JP2020/009573, dated May 26, 2020.

*Primary Examiner* — John R Lee
(74) *Attorney, Agent, or Firm* — BACON & THOMAS, PLLC

(57) ABSTRACT

A low reflective film includes a first resin layer. The first resin layer includes a binder resin and an organic resin particle having an average particle size $D_{50}$ of 2 to 20 μm. A surface of the first resin layer has a reflectance and gloss values satisfying the following relationships:
  (1) regular reflectance at 70 degrees: 0.0% or more and 2.5% or less (wavelength 550 nm);
  (2) specular gloss value at 60 degrees: 0.0% or more and 6.0% or less;
  specular gloss value at 75 degrees: 0.0% or more and 6.0% or less;
  specular gloss value at 85 degrees: 0.0% or more and 6.0% or less; and
(Continued)

(3) a sum of a specular gloss value at 20°, a specular gloss value at 45°, the specular gloss value at 60°, the specular gloss value at 75°, and the specular gloss value at 85° is 7.5% or less.

16 Claims, 2 Drawing Sheets

(51) Int. Cl.
*B32B 27/20* (2006.01)
*C08L 33/08* (2006.01)
*C09J 7/29* (2018.01)
*G01J 1/02* (2006.01)

(52) U.S. Cl.
CPC ............... *C09J 7/29* (2018.01); *G01J 1/0214* (2013.01); *B32B 2307/408* (2013.01); *C08L 2203/16* (2013.01); *C08L 2205/025* (2013.01); *C09J 2433/00* (2013.01); *C09J 2467/006* (2013.01)

(58) Field of Classification Search
CPC .......... C08L 33/04; C08L 33/06; C08L 33/08; C09J 2467/006; C09J 7/20; C09J 7/29; G01J 1/02; G01J 1/0214; G02B 5/08; G02B 5/0808
See application file for complete search history.

(56) References Cited

U.S. PATENT DOCUMENTS

| | | | |
|---|---|---|---|
| 2009/0004464 A1* | 1/2009 | Diehl | G02B 5/0808 |
| | | | 427/407.1 |
| 2010/0226016 A1 | 9/2010 | Hirauchi | |
| 2012/0251095 A1 | 10/2012 | Ono et al. | |
| 2014/0016202 A1 | 1/2014 | Toshima | |
| 2018/0117812 A1* | 5/2018 | An | B29C 45/372 |
| 2019/0107649 A1* | 4/2019 | Ikegami | G02B 1/10 |
| 2019/0206925 A1 | 7/2019 | Yamamoto et al. | |
| 2019/0331959 A1* | 10/2019 | Weindorf | G02F 1/13725 |
| 2022/0171104 A1* | 6/2022 | Nozawa | B32B 7/12 |

FOREIGN PATENT DOCUMENTS

| | | |
|---|---|---|
| JP | H10268105 A | 10/1998 |
| JP | 2002220562 A | 8/2002 |
| JP | 2003020384 A | 1/2003 |
| JP | 2010534342 A | 9/2010 |
| JP | 2018004844 A | 1/2018 |
| JP | 2018046040 A | 3/2018 |

\* cited by examiner

[Figure 1]
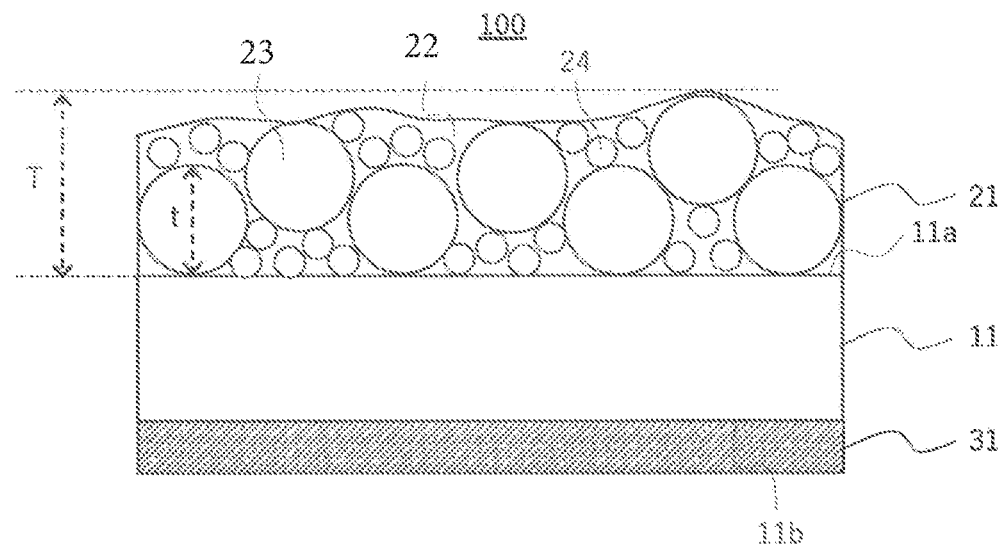
[Figure 2]
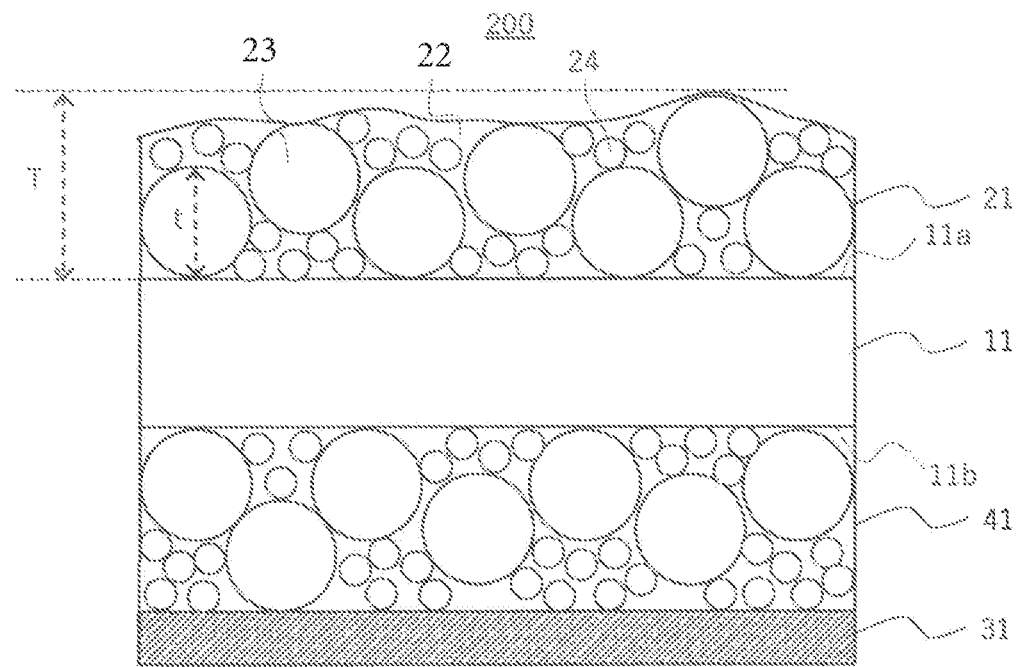

[Figure 3]
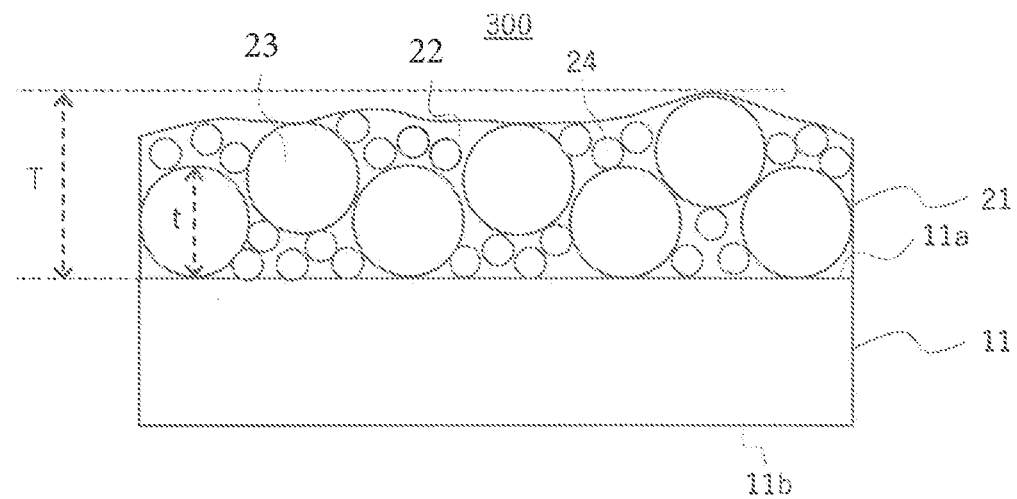
[Figure 4]
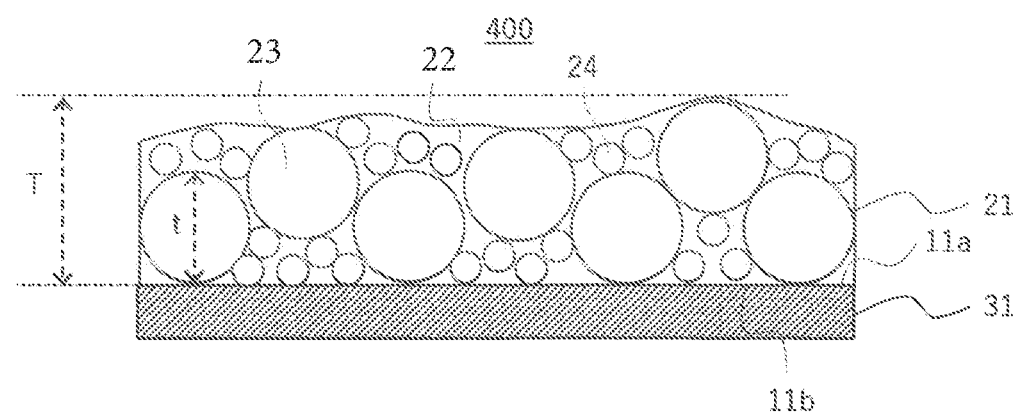

LOW REFLECTIVE FILM AND OPTICAL SENSING KIT USING THE SAME, AND LOW REFLECTIVE MOLDED PRODUCT

FIELD OF THE INVENTION

The present invention relates to a novel low reflective film low in surface reflectance and surface gloss value at a wide angle, and an optical sensing kit using the low reflective film, as well as a low reflective molded product and the like.

BACKGROUND OF THE INVENTION

According to recent remarkable progress in a sensing technology, there has been studied introduction of a high-level sensing technology into various moving bodies (hereinafter, sometimes referred to as "moving vehicles".) such as automobiles, railway trains, trains, electric trains, ships, cargo ships, aircrafts, spacecrafts, rockets, transport equipment, and vehicles.

As one example, an automobile has been progressively developed where an optical sensor provided with an imaging element, such as a camera module or an infrared sensor, is placed in an inside of the automobile in order to detect any obstacle (for example, other vehicle, a pedestrian, a guardrail, and a house) located in front of own vehicle. Such an optical sensor, for example, images a vehicle outside from a vehicle inside through window glass, or detects visible light and/or infrared light in a vehicle outside from a vehicle inside.

Meanwhile, a large number of interior members such as a dashboard, a roof trim, a sun visor, a switch panel, a decoration panel, steering, and a seat are placed in the inside of a moving vehicle in which such an optical sensor is placed, and such an optical sensor may also be provided with resin accessories such as a camera hood and a lens hood (hereinafter, these are sometimes collectively referred to as "interior part").

In such an interior part, a molded product with light weight and excellent durability made of a resin such as a thermoplastic resin and a thermoplastic elastomer, a multi-layered laminated product using such a resin, a non-woven fabric or a skin material and the like have been recently used frequently. For such interior parts for moving vehicles, there have also been proposed a large number of resin materials suppressing gloss of a product surface and imparting matting properties (see Patent Literatures 1 to 4) from the viewpoint of safety or from the viewpoint of designability for providing a mat-toned and gentle texture imparting a high-class feeling.

LIST OF PATENT LITERATURE

Japanese Patent Laid-Open No. 6-057007
Japanese Patent Laid-Open No. 7-314519
Japanese Patent Laid-Open No. 2002-220562
Japanese Patent Laid-Open No. 2003-020384

SUMMARY OF THE INVENTION

A sensing technology using the above-mentioned optical sensor causes halation, lens flare, ghost, and/or the like to occur to result in remarkable degradation of an image taken or remarkable deterioration in detection accuracy of sensing, when light (unnecessary light) reflected on the surface of any interior part is incident into such an optical sensor. On the contrary, the techniques of Patent Literatures 1 to 4 are each merely a technique for imparting matting properties in terms of an appearance, and still exhibit large surface gloss values (a specular gloss value at 60 degrees of 9 to 35% (Patent Literature 1), a specular gloss value at 60 degrees of 10 to 30% (Patent Literature 2), a specular gloss value at 60 degrees of 7.3 to 15.2% (Patent Literature 3), and a specular gloss value at 45 degrees of 4.7 to 18% (Patent Literature 4)). Thus, there is a demand for development of a material smaller in surface gloss value.

In particular, imaging, sensing, and the like tend to be hereafter demanded at extremely high accuracies in an application of an optical sensing kit for moving vehicles. A resin material low in gloss, for use in such an application, usually exhibits a relatively large specular gloss value at a wide angle (both an incident angle and a reflection angle: 45° or more) as compared with a specular gloss value at a low angle (both an incident angle and a reflection angle: less than 45°). Thus, such a resin material low in gloss, of Patent Literatures 1 to 4, not only exhibits large specular gloss value at 45 degrees and specular gloss value at 60 degrees, but also exhibits a larger specular gloss value at a much wider angle, for example, a larger specular gloss value at 75 degrees and a larger specular gloss value at 85 degrees. For example, a light-shielding film (product name: Carbon-feather X6B manufactured by KIMOTO) as a commercially available product exhibits a surface reflectance and surface gloss values, as follows. Accordingly, in a case where such a resin material of the prior art is used in an application of an optical sensing kit, the influence of reflected light at a wide angle still highly remains and thus imaging, sensing, and the like are difficult to perform at higher accuracies.

TABLE 1

| Specular gloss value (%) | 20° | 0.2 |
|---|---|---|
| | 45° | 2.0 |
| | 60° | 3.4 |
| | 75° | 14.1 |
| | 85° | 25.7 |
| | Total | 45.2 |
| Regular reflectance (%) at 70 degrees (550 nm) | | 2.8 |

The present invention has been made in view of the above problems. In other words, an object of the present invention is to provide, for example, a novel low reflective film small in surface reflectance and surface gloss values in a wide angle region, and an optical sensing kit using the low reflective film, as well as a low reflective molded product.

The present inventors have made intensive studies about surface optical characteristics of a low reflective film suitable for imaging, sensing, and the like at higher accuracies in order to solve the above problems, and as a result, have newly found a low reflective film and a low reflective molded product which are each small in surface reflectance and surface gloss value in a wide angle region, leading to completion of the present invention.

That is, the present invention provides various specific aspects represented below.

[1] A low reflective film including at least a first resin layer, wherein the first resin layer includes at least a binder resin, and an organic resin particle having an average particle size $D_{50}$ of 2 to 20 μm, and a surface of the first resin layer has a reflectance and gloss values satisfying the following relationships:
  (1) regular reflectance at 70 degrees: 0.0% or more and 2.5% or less (wavelength 550 nm)

(2) specular gloss value at 60 degrees: 0.0% or more and 6.0% or less specular gloss value at 75 degrees: 0.0% or more and 6.0% or less specular gloss value at 85 degrees: 0.0% or more and 6.0% or less, and (3) a sum of a specular gloss value at 20°, a specular gloss value at 45°, the specular gloss value at 60°, the specular gloss value at 75°, and the specular gloss value at 85° is 7.5% or less.

[2] The low reflective film according to [1], wherein the organic resin particle has an average particle size $D_{50}$ of 5 to 20 μm.

[3] The low reflective film according to [1] or [2], wherein a content rate of the organic resin particle to the binder resin is 0.6 to 2.5.

[4] The low reflective film according to any one of [1] to [3], wherein the first resin layer has a thickness of 0.5 to 8.0 times of an average particle size $D_{50}$ of the organic resin particle comprised in the first resin layer.

[5] The low reflective film according to any one of [1] to [4], having an optical density of 0.5 or more.

[6] The low reflective film according to any one of [1] to [5], wherein the first resin layer further comprises carbon black.

[7] The low reflective film according to any one of [1] to [6], having a laminated structure comprising at least the first resin layer and a pressure-sensitive adhesive layer in the listed order.

[8] The low reflective film according to any one of [1] to [7], having a laminated structure comprising at least the first resin layer and a substrate film in the listed order.

[9] The low reflective film according to any one of [1] to [8], having a laminated structure comprising at least the first resin layer, a substrate film, and a pressure-sensitive adhesive layer in the listed order.

[10] The low reflective film according to any one of [1] to [9], having a laminated structure comprising at least the first resin layer, a substrate film, a second resin layer, and a pressure-sensitive adhesive layer in the listed order.

[11] The low reflective film according to any one of [7] to [10], wherein the pressure-sensitive adhesive layer comprises one or more pressure-sensitive adhesives selected from the group consisting of a rubber-based pressure-sensitive adhesive, an acrylic pressure-sensitive adhesive, an olefin-based pressure-sensitive adhesive, a silicone-based pressure-sensitive adhesive, and a urethane-based pressure-sensitive adhesive.

[12] The low reflective film according to any one of [1] to [11], wherein the first resin layer has a surface roughness Ra of 0.8 to 4.0 μm.

[13] An optical sensing kit including at least an optical sensor which is disposed in an inside of a room of a moving vehicle and which images an outside of the room of the moving vehicle or detects visible light or infrared light in the outside of the room through a window transparent to visible light or infrared light, and a low reflective film which covers a surface of an interior part disposed in the inside of the room and which reduces reflected light of external light on the surface to thereby allow the optical sensor to be enhanced in imaging accuracy and/or detection accuracy, wherein the low reflective film includes at least a first resin layer, in which the first resin layer includes at least a binder resin, and an organic resin particle having an average particle size $D_{50}$ of 2 to 20 μm, and a surface of the first resin layer has a reflectance and gloss values satisfying the following relationships:

(1) regular reflectance at 70 degrees: 0.0% or more and 2.5% or less (wavelength 550 nm)

(2) specular gloss value at 60 degrees: 0.0% or more and 6.0% or less specular gloss value at 75 degrees: 0.0% or more and 6.0% or less specular gloss value at 85 degrees: 0.0% or more and 6.0% or less, and (3) a sum of a specular gloss value at 20°, a specular gloss value at 45°, the specular gloss value at 60°, the specular gloss value at 75°, and the specular gloss value at 85° is 7.5% or less.

[14] The optical sensing kit according to [13], wherein the organic resin particle has an average particle size $D_{50}$ of 5 to 20 μm.

[15] The optical sensing kit according to [13] or [14], wherein the interior part corresponds to one or more selected from the group consisting of a resin molded product, a multi-layered laminated product using the resin molded product, a non-woven fabric, and a skin material.

The reflective film for use in the optical sensing kit according to [13] or [14] preferably further has any one or more technical features of [3] to [12].

[16] A low reflective molded product which covers a surface of an article, wherein the low reflective molded product includes at least a binder resin, and an organic resin particle having an average particle size $D_{50}$ of 2 to 20 μm, and at least one surface of the low reflective molded product has a reflectance and gloss values satisfying the following relationships:

(1) regular reflectance at 70 degrees: 0.0% or more and 2.5% or less (wavelength 550 nm)

(2) specular gloss value at 60 degrees: 0.0% or more and 6.0% or less specular gloss value at 75 degrees: 0.0% or more and 6.0% or less specular gloss value at 85 degrees: 0.0% or more and 6.0% or less, and (3) a sum of a specular gloss value at 20°, a specular gloss value at 45°, the specular gloss value at 60°, the specular gloss value at 75°, and the specular gloss value at 85° is 7.5% or less.

The low reflective molded product according to [16] preferably further has any one or more technical features of [3] to [12]. It is to be noted that the first resin layer is to be read as the first resin layer and the low reflective film is to be read as the low reflective molded product.

According to the present invention, there can be realized a low reflective film and a low reflective molded product which are each small in surface reflectance and surface gloss value in a wide angle region, and there can be provided a new material which has not been conventionally present. Such a low reflective film or low reflective molded product can be then used to thereby realize, for example, a matted product small in surface gloss value even at a wide angle, and such a low reflective film can be used as a skin film for interior parts, in an application of an optical sensing kit, to thereby inhibit an optical sensor from causing a degraded image taken or a deteriorated detection accuracy. According to the present invention, not only a new material excellent in low reflectivity in a wide angle region can be realized, but also imaging, sensing, and the like at high accuracies can be realized in various moving vehicles such as an automobile, a railway train, a train, an electric train, a ship, a cargo ship, an aircraft, a spacecraft, a rocket, transport equipment, and a vehicle.

BRIEF DESCRIPTION OF THE DRAWINGS

FIG. 1 A schematic cross-sectional view illustrating a low reflective film 100 of one embodiment.

FIG. 2 A schematic cross-sectional view illustrating a low reflective film 200 of Modified Example.

FIG. 3 A schematic cross-sectional view illustrating a low reflective film 300 of Modified Example.

FIG. 4 A schematic cross-sectional view illustrating a low reflective film 400 of Modified Example.

DETAILED DESCRIPTION OF THE INVENTION

Hereinafter, embodiments of the present invention will be described in detail with reference to the drawings. It is noted that a positional relationship among the left, right, top and bottom is based on a positional relationship illustrated in the drawings, unless particularly noted. A dimensional ratio in the drawings is not limited to a ratio illustrated. Herein, the following embodiments are illustrative for describing the present invention and the present invention is not limited thereto. The designation of any numerical value range, for example, "1 to 100", herein includes both the upper limit value "100" and the lower limit value "1". The same applies to the designations of other numerical value ranges.

First Embodiment

FIG. 1 is a cross-sectional view illustrating a main section of a low reflective film 100 of a first embodiment of the present invention. The low reflective film 100 includes a substrate film 11, a first resin layer 21 provided on one surface 11a of the substrate film 11, and a pressure-sensitive adhesive layer 31 provided on other surface 11b of the substrate film 11. In other words, the low reflective film 100 of the present embodiment has a laminated structure (three-layered structure) where the first resin layer 21, the substrate film 11, and the pressure-sensitive adhesive layer 31 are at least arranged in the listed order. In the laminated structure, not only the first resin layer 21 is disposed as the outermost surface on the front, but also the pressure-sensitive adhesive layer 31 is disposed as the outermost surface on the rear, in which the first resin layer 21 and the pressure-sensitive adhesive layer 31 are disposed in the state of being exposed on the respective outermost surfaces on the front and rear. Any optional layer(s) such as an antistatic layer and/or a protection layer may be, if necessary, provided on a surface of the first resin layer 21.

The phrase "provided on one (other) surface of . . . " is herein meant to encompass not only an aspect where the first resin layer 21 and the pressure-sensitive adhesive layer 31 are directly disposed on the surfaces (for example, surface 11a and surface 11b) of the substrate film 11, as in the present embodiment, but also an aspect where any optional layer(s) not illustrated (for example, a primer layer and/or an adhesive layer) are/is interposed between the surface 11a of the substrate film 11 and the first resin layer 21, and/or between the surface 11b of the substrate film 11 and the pressure-sensitive adhesive layer 31 to thereby allow the first resin layer 21 and the pressure-sensitive adhesive layer 31 to be disposed away from the substrate film 11. The laminated structure including at least the first resin layer 21 and the pressure-sensitive adhesive layer 31 is meant to encompass not only a structure where only the first resin layer 21 and the pressure-sensitive adhesive layer 31 are directly laminated on the substrate film 11, but also such a structure where optional layer(s) described above are/is further provided among the layers of the three-layered structure.

The substrate film 11 is not particularly limited in terms of the type thereof as long as it can support the first resin layer 21 and the pressure-sensitive adhesive layer 31. A synthetic resin film is preferably used from the viewpoint of, for example, dimension stability, mechanical strength, and weight saving. Specific examples of the synthetic resin film include a polyester film, an ABS (acrylonitrile-butadiene-styrene) film, a polyimide film, a polyamide film, a polyamide imide film, a polystyrene film, and a polycarbonate film. An acrylic film, a nylon-based film, a polyolefin-based film such as a polyethylene or polypropylene film, or a cellulose-based, polysulfone-based, polyphenylenesulfide-based, polyethersulfone-based, or polyether ether ketone-based film can also be used. In particular, the substrate film 11 suitably used is a polyester film or a polyimide film. In particular, a uniaxially or biaxially oriented film, particularly a biaxially oriented polyester film is particularly preferable because of being excellent in mechanical strength and dimension stability. A polyimide film, a polyamide imide film, and a polyamide film are particularly preferable, and a polyimide film and a polyamide imide film are most preferable, in a heat resistance application. Such a film can be used singly or in combinations of two or more kinds thereof.

The thickness of the substrate film 11 can be appropriately set depending on required performance and application, and is not particularly limited. The thickness of the substrate film 11 is preferably 0.5 µm or more and 250 µm or less, more preferably 1 µm or more and 100 µm or less, further preferably 5 µm or more and 50 µm or less, particularly preferably 10 µm or more and 30 µm or less from the viewpoint of weight saving and film thinning. The surfaces of the substrate film 11 can also be, if necessary, subjected to any of various known surface treatments such as an anchor treatment and a corona treatment, from the viewpoint of an enhancement in adhesiveness to the first resin layer 21 and the pressure-sensitive adhesive layer 31.

The appearance of the substrate film 11 may be any of transparent, semi-transparent, and opaque, is not particularly limited, and preferably has light-shielding properties. For example, a synthetic resin film foamed, such as a foamed polyester film, or a synthetic resin film containing various pigments can also be used. For example, a synthetic resin film containing at least one dark color-based pigment or dye of black, gray, purple, blue, brown, red, green, or the like can be used to thereby provide a light-shielding film high in optical density. Such a pigment or dye here used can be appropriately selected from those known in the art and then used, and the type thereof is not particularly limited. Examples of such a black-based pigment include a black resin particle, magnetite-based black, copper/iron/manganese-based black, titanium black, and carbon black. In particular, a black resin particle, titanium black, and carbon black are preferable because of being excellent in concealing properties. Such a pigment can be used singly or in combinations of two or more kinds thereof. In a case where the substrate film 11 contains such a pigment or dye, the content rate can be appropriately set depending on required performance and application, and is not particularly limited. The total content rate of such pigment and dye is preferably 0.3 to 15% by mass, more preferably 0.4 to 12% by mass, further preferably 0.5 to 10% by mass based on the total amount of the substrate film 11, from the viewpoint of dimension stability, mechanical strength, weight saving, and the like.

The first resin layer 21 is a resin layer including at least a binder resin 22 and an organic resin particle 23 having an average particle size $D_{50}$ of 2 to 20 µm, and having the above-mentioned predetermined reflectance and gloss values. Any material known in the art can be used as the material constituting the first resin layer 21, and the type thereof is not particularly limited. Thus, the resin layer containing the binder resin and the organic resin particle 23 dispersed in the binder resin can be used to thereby allow such a first resin layer 21 satisfying the above-mentioned optical characteristics to be realized. Hereinafter, there will be described in more detail.

The binder resin 22 is a thermoplastic resin or a thermosetting resin, such as a poly(meth)acrylic acid-based resin, a polyester-based resin, a polyvinyl acetate-based resin, a polyvinyl chloride-based resin, a polyvinyl butyral-based resin, a cellulose-based resin, a polystyrene/polybutadiene resin, a polyurethane-based resin, an alkyd resin, an acrylic resin, an unsaturated polyester-based resin, an epoxy ester-based resin, an epoxy-based resin, an epoxy acrylate-based resin, a urethane acrylate-based resin, a polyester acrylate-based resin, a polyether acrylate-based resin, a phenol-based resin, a melamine-based resin, a urea-based resin, or a diallyl phthalate-based resin, but not particularly limited thereto. For example, a thermoplastic elastomer, a thermosetting elastomer, an ultraviolet curing type resin, or an electron beam curing type resin can also be used. Such a resin can be used singly or in combinations of two or more kinds thereof. The binder resin 22 can be appropriately selected and used depending on required performance and application. For example, a thermosetting resin is preferable in an application where heat resistance is demanded.

The content (total amount) of the binder resin 22 in the first resin layer 21 may be appropriately adjusted at a level necessary for film formation, and is not particularly limited. The content (total amount) of the binder resin 22 is preferably 5 to 65% by mass, more preferably 15 to 55% by mass, further preferably 20 to 50% by mass, particularly preferably 25 to 45% by mass based on the total amount of the first resin layer 21, from the viewpoint that such a first resin layer 21 having superior surface reflectances and surface gloss values is realized.

The first resin layer 21 in the low reflective film 100 of the present embodiment contains any relatively coarse organic resin particle 23 in order to impart the above-mentioned reflectance and gloss values. The average particle size $D_{50}$ of the organic resin particle 23 is preferably 2 to 20 µm, more preferably 4 to 20 µm, further preferably 5 to 20 µm, still further preferably 6 to 15 µm, particularly preferably 7 to 14 µm, most preferably 10 to 14 µm, from the viewpoint that objective reflectance and gloss values are obtained at good reproducibility.

A material known in the art can be used as the material of the organic resin particle 23, and the type thereof is not particularly limited. Specific examples include polymethyl methacrylate-based, polystyrene-based, polyester-based, polyurethane-based, and rubber resin particles, but not particularly limited thereto. The appearance of the organic resin particle 23 may be any of transparent, semi-transparent, and opaque, and is not particularly limited. The appearance of the organic resin particle 23 may be colorless or colored. For example, a colored organic resin particle, which is colored black, gray, purple, blue, brown, red, green, or the like, can be used to thereby provide a light-shielding film high in optical density. The organic resin particle 23 can be used singly or in combinations of two or more kinds thereof.

The content (total amount) of the organic resin particle 23 in the first resin layer 21 is not particularly limited as long as the above-mentioned surface reflectance and surface gloss values are obtained. The content (total amount) of the organic resin particle 23 is preferably 35 to 95% by mass, more preferably 40 to 85% by mass, further preferably 45 to 80% by mass, particularly preferably 50 to 75% by mass based on the total amount of the first resin layer 21, from the viewpoint that such a first resin layer 21 having superior surface reflectances and surface gloss values is realized. The content of the organic resin particle 23, while varies depending on the type, the average particle size $D_{50}$ and the like of the organic resin particle 23 used, is preferably set within the above-mentioned range in consideration of the proportion of the binder resin 22 used, from the viewpoint that the above-mentioned preferable surface reflectance and surface gloss values are realized at good reproducibility. In other words, the content rate of the organic resin particle based on the total mass of the binder resin in the first resin layer 21 is preferably 0.6 to 2.5, more preferably 0.7 to 2.3, further preferably 0.8 to 2.0.

The first resin layer 21 may contain an inorganic particle 24, together with the organic resin particle 23. The inorganic particle 24 can be used in combination, to thereby more enhance light-shielding properties and/or more reduce the surface reflectance and surface gloss values. Any of various pigments or dyes known in the art can be used as the inorganic particle 24, and the type thereof is not particularly limited. Examples include kaolin, fired kaolin, fired clay, unfired clay, silica (for example, natural silica, fused silica, amorphous silica, hollow silica, wet silica, synthetic silica, and aerosil), aluminum compounds (for example, boehmite, aluminum hydroxide, alumina, hydrotalcite, aluminum borate, and aluminum nitride), magnesium compounds (for example, magnesium aluminometasilicate, magnesium carbonate, magnesium oxide, and magnesium hydroxide), calcium compounds (for example, calcium carbonate, calcium hydroxide, calcium sulfate, calcium sulfite, and calcium borate), molybdenum compounds (for example, molybdenum oxide and zinc molybdate), talc (for example, natural talc and fired talc), mica(isinglass), titanium oxide, zinc oxide, zirconium oxide, barium sulfate, zinc borate, barium metaborate, sodium borate, boron nitride, aggregated boron nitride, silicon nitride, carbon nitride, strontium titanate, barium titanate, and stannates such as zinc stannate, but not particularly limited thereto. A black inorganic pigment is preferably used from the viewpoint of enhancements in light-shielding properties and concealing properties. Examples of the black inorganic pigment include a black resin particle, magnetite-based black, copper/iron/manganese-based black, titanium black, carbon black, and aniline black, but not particularly limited thereto. In particular, the black inorganic pigment is preferably a black resin particle, titanium black, carbon black, or aniline black, more preferably carbon black or aniline black. On the other hand, a low gloss and deep black design having a high-class feeling has been recently increasingly popular from the viewpoint of design property, and there has been a demand for conformance therewith. It is possible for such a demand to increase light scattering in the first resin layer 21 by using a hollow particle such as hollow silica, as the inorganic particle 24, and reduce the surface reflectance of the first resin layer 21, in particular, the surface reflectance in a wide angle region, thereby realizing a deeper black, dark color-based first resin layer 21. Such an inorganic particle can be used singly or in combinations of two or more kinds thereof.

Examples of the carbon black include those produced by any of various known production methods, such as oil furnace black, lamp black, channel black, gas furnace black, acetylene black, thermal black, and Ketjen black, but the type thereof is not particularly limited. Conductive carbon black is particularly preferably used from the viewpoint that conductivity is imparted to the first resin layer 21 to thereby prevent charging due to static electricity. Carbon black has a long history, simple carbon black substances and carbon black dispersions of various grades are commercially available from, for example, Mitsubishi Chemical Corporation, Asahi Carbon Co., Ltd., Mikuni Color Ltd., Resino Color Industry Co., Ltd., Cabot Corporation, and Degussa AG, and the carbon black here used may be appropriately selected therefrom depending on required performance and application. The particle size of the carbon black here used can be appropriately set depending on required performance and the like, and is not particularly limited. The average particle size $D_{50}$ of the carbon black is preferably 0.01 to 2.0 μm, more preferably 0.05 to 1.0 μm, further preferably 0.08 to 0.5 μm. The average particle size $D_{50}$ herein means a median size ($D_{50}$) on a volume basis, measured with a laser diffraction type particle size distribution measurement apparatus (for example, Shimadzu Corporation: SALD-7000).

In the case of use of the inorganic particle 24, the content (total amount) of the inorganic particle 24 is preferably 1 to 55% by mass, more preferably 5 to 45% by mass, further preferably 7 to 40% by mass, particularly preferably 7 to 30% by mass based on the total amount of the first resin layer 21, from the viewpoint of, for example, dispersibility, film-forming properties, handleability, light-shielding properties, and matting properties, and from the viewpoint of a balance of compounding with the above-mentioned binder resin 22 and organic resin particle 23.

The first resin layer 21 may contain any of various additives known in the art. Specific examples of such known various additives include a lubricant, a conductive agent, a flame retardant, an antibacterial agent, a mildew-proofing agent, an antioxidant, a plasticizer, a resin curing agent, a curing accelerator, a leveling agent, a fluidity controlling agent, a defoaming agent, and a dispersant, but not particularly limited thereto. Examples of the lubricant include hydrocarbon-based lubricants such as polyethylene, paraffin, and wax; fatty acid-based lubricants such as stearic acid and 12-hydroxystearic acid; amide-based lubricants such as stearic acid amide, oleic acid amide, and erucic acid amide; ester-based lubricants such as butyl stearate and monoglyceride stearate; alcohol-based lubricants; solid lubricants such as metal soap, talc, and molybdenum disulfide; particles of silicone resins; and particles of fluororesins such as polytetrafluoroethylene wax and polyvinylidene fluoride, but not particularly limited thereto. In particular, an organic lubricant is particularly preferably used. In a case where an ultraviolet curing type resin or an electron beam curing type resin is used as a binder resin, for example, a sensitizer such as n-butylamine, triethylamine, or tri-n-butyl phosphine, and/or an ultraviolet absorber may also be used. These can be used singly or in combinations of two or more kinds thereof. The content rate thereof is not particularly limited, and is preferably generally 0.01 to 5% by mass in terms of solid content relative to the entire resin component included in the first resin layer 21.

The thickness T of the first resin layer 21 can be appropriately set depending on required performance and application, and is not particularly limited. The thickness T of the first resin layer 21 is preferably 0.1 μm or more, more preferably 0.2 μm or more, further preferably 0.5 μm or more, particularly preferably 1.0 μm or more, most preferably 4.0 μm or more and the upper limit is preferably 40 μm or less, more preferably 35 μm or less, further preferably 30 μm or less, particularly preferably 25 μm or less, from the viewpoint of a balance among a high optical density, weight saving, and film thinning. The thickness T of the first resin layer 21 is here the highest thickness, in a case where any surface asperity is present as illustrated. The thickness T of the first resin layer 21 is desirably set within the above-mentioned range in consideration of the average particle size $D_{50}$ of the organic resin particle 23 used, from the viewpoint that the above-mentioned preferable surface reflectance and surface gloss values are realized at good reproducibility. In other words, the thickness T of the first resin layer 21 (μm) is preferably adjusted within the range from 0.5 to 8.0 in terms of T/t, under the assumption that the average particle size $D_{50}$ of the organic resin particle 23 is t(μm). The T/t, while also varies depending on a film formation method, is generally preferably 0.5 to 3.0, more preferably 0.6 to 2.5, further preferably 0.9 to 2.4, particularly preferably 1.0 to 2.3, most preferably 1.3 to 2.2. The T/t, while also varies depending on a coating method, is preferably 1.5 or more, more preferably 2.0 or more, further preferably 3.0 or more, and the upper limit may also be preferably 8.0 or less, more preferably 7.5 or less. The surfaces of the first resin layer 21 can also be, if necessary, subjected to any of various known surface treatments such as an anchor treatment and a corona treatment.

The total thickness of the low reflective film 100 is preferably 0.5 μm or more, more preferably 5 μm or more, further preferably 10 μm or more, particularly preferably 25 μm or more and the upper limit is preferably 500 μm or less, more preferably 400 μm or less, further preferably 300 μm or less, particularly preferably 250 μm or less, from the viewpoint of, for example, weight saving, film thinning, and handleability.

The optical density (OD) of the first resin layer 21 is preferably 0.5 or more, more preferably 1.0 or more, further preferably 1.7 or more, particularly preferably 2.0 or more, from the viewpoint that high light-shielding properties of a light-shielding member are provided. The optical density (OD) is herein a value obtained by measurement with an optical densitometer (X-Rite 361T: X-Rite Inc.) and an ortho filter, according to ISO 5-2.

The surface shape of the low reflective film 100 of the present embodiment is adjusted to have asperity in order to decrease the surface reflectance and surface gloss values in a wide angle region, as described above. The surface roughness Ra of a surface (a surface of the first resin layer 21 in the present embodiment) of the first resin layer 21 of the low reflective film 100 can be appropriately set depending on required performance and application, is not particularly limited, and is preferably 0.8 to 4.0 μm, more preferably 1.0 to 3.6 μm, further preferably 1.5 to 3.3 μm, particularly preferably 2.0 to 3.0 μm, from the viewpoint of realizing of superior surface reflectance and surface gloss values and from the viewpoint of a balance among a high optical density, weight saving, and film thinning. The surface roughness Ra is herein a value measured according to the method for measuring the arithmetic average roughness (Ra) in JIS-B0601 (2001). For example, the surface roughness can be measured with a stylus type surface roughness measurement machine (SURFCOM 1500SD2-3DF: Tokyo Seimitsu Co., Ltd.).

The surface reflectance of the low reflective film 100 of the present embodiment is adjusted so that a surface (a surface of the first resin layer 21 in the present embodiment) of the first resin layer 21 of the low reflective film 100 has a regular reflectance at 70 degrees of 0.0% or more and 2.5% or less (wavelength 550 nm), in order to decrease the surface reflection in a wide angle region, as described above. The regular reflectance at 70 degrees is preferably 0.0% or more and 2.0% or less (wavelength 550 nm), more preferably 0.0% or more and 1.5% or less (wavelength 550 nm), further preferably 0.0% or more and 1.0% or less (wavelength 550 nm), particularly preferably 0.0% or more and 0.5% or less (wavelength 550 nm), from the viewpoint that, for example, higher matting properties and low surface reflection are realized. The regular reflectance at 70 degrees is herein a value obtained by measuring the regular reflectance (specular reflectance) (%) of a surface of the first resin layer 21 at an incident light receiving angle of 70° of light at a wavelength of 550 nm, with a spectrophotometer (SolidSpec-3700: Shimadzu Corporation).

The specular gloss value of the low reflective film 100 of the present embodiment is adjusted so that the specular gloss value at 60 degrees is 0.0% or more and 6.0% or less, the specular gloss value at 75 degrees is 0.0% or more and 6.0% or less, and the specular gloss value at 85 degrees is 0.0% or more and 6.0% or less, as the specular gloss value of a surface (a surface of the first resin layer 21 in the present embodiment) of the first resin layer 21 of the low reflective film 100, in order to decrease the specular gloss in a wide angle region, as described above. Preferably, the specular gloss value at 60 degrees is 0.0% or more and 4.0% or less, the specular gloss value at 75 degrees is 0.0% or more and 4.0% or less, and the specular gloss value at 85 degrees is 0.0% or more and 4.0% or less, further preferably, the specular gloss value at 60 degrees is 0.0% or more and 3.0% or less, the specular gloss value at 75 degrees is 0.0% or more and 3.0% or less, and the specular gloss value at 85 degrees is 0.0% or more and 3.0% or less, further preferably, the specular gloss value at 60 degrees is 0.0% or more and 2.0% or less, the specular gloss value at 75 degrees is 0.0% or more and 2.0% or less, and the specular gloss value at 85 degrees is 0.0% or more and 2.0% or less, from the viewpoint that, for example, higher matting properties and low glossiness are realized.

The specular gloss value of the low reflective film 100 of the present embodiment, as the sum of the specular gloss value at 20°, the specular gloss value at 45°, the specular gloss value at 60°, the specular gloss value at 75°, and the specular gloss value at 85°, is preferably 7.5% or less, more preferably 6.0% or less, further preferably 5.0% or less, particularly preferably 4.0% or less, most preferably 3.0% or less, from the viewpoint that low gloss is broadly realized from a low angle region to a wide angle region and from the viewpoint of a balance among light-shielding properties, low gloss, low reflectivity and light absorption properties. The specular gloss value is herein a value obtained by measuring the gloss value (specular gloss value) (%) of a surface of the first resin layer 21 at each defined incident light receiving angle (20°, 45°, 60°, 75°, 85°) with a digital variable angle gloss meter (Gloss Meter VG7000: Nippon Denshoku Industries Co., Ltd.) according to JIS-Z8741: 1997.

The luminous reflectance Y value in a CIE 1976 XYZ color system, of one surface of the low reflective film 100 of the embodiment, is based on the diffusion reflectance by use of an integrating sphere and is preferably 0.1 to 4.0%, more preferably 0.1 to 3.0%, further preferably 0.1 to 2.0%, particularly preferably 0.1 to 1.0%, from the viewpoint that a low gloss and deep black, dark color-based design having a high-class feeling is realized. The luminous reflectance Y value corresponds to a quantitatively determined value which expresses the intensity of reflected light felt by human beings, as it is, and, as the value is smaller, a dark color-based design is obtained which is lower in intensity of reflected light, lower in reflection and deeper in black. The luminous reflectance Y value is a luminous reflectance Y (%) in an XYZ (Yxy) color system, measured according to JIS Z 8701, and can be measured with a spectrophotometric colorimeter (for example, spectrophotometer U-4100 (manufactured by Hitachi High-Technologies Corporation)). The luminous reflectance Y value at each angle, based on the specular reflectance, preferably satisfies the following relationships from the viewpoint that a low gloss and dark color design is broadly realized from a low angle region to a wide angle region.

5°: 0.01 to 0.10% (more preferably 0.01 to 0.05%)
20°: 0.01 to 0.10% (more preferably 0.01 to 0.05%)
45°: 0.01 to 0.20% (more preferably 0.01 to 0.06%)
60°: 0.01 to 0.50% (more preferably 0.01 to 0.25%)
70°: 0.01 to 1.50% (more preferably 0.01 to 0.40%)

The conductivity ($\Omega/\square$) of a surface (a surface of the first resin layer 21 in the present embodiment) of the first resin layer 21 of the low reflective film 100 can be appropriately set depending on required performance and application, is not particularly limited, and is preferably $1.0 \times 10^8 (\Omega/\square)$ or less, more preferably $1.0 \times 10^7 (\Omega/\square)$ or less, further preferably $1.0 \times 10^6 (\Omega/\square)$ or less, particularly preferably $1.0 \times 10^5 \Omega$ or less from the viewpoint of handleability and the like. The conductivity is herein a value measured according to JIS-K6911:1995. Such a first resin layer 21 can be obtained by, for example, using conductive carbon black as a pigment or performing an antistatic treatment which provides conductive carbon black to a surface of the first resin layer 21.

The optical density (OD) of the entire low reflective film 100 is preferably 0.5 or more, more preferably 1.0 or more, further preferably 1.7 or more, particularly preferably 2.0 or more from the viewpoint that high light-shielding properties of a light-shielding member are provided.

The pressure-sensitive adhesive layer 31 is a layer which is provided on the surface 11$b$ of the above-mentioned substrate film 11 and which is pressure-sensitive bonded to an adherend not illustrated. The pressure-sensitive adhesive layer 31 can be thus pressure-sensitive bonded to the adherend to thereby provide a surface low in reflectance and low in gloss in a wide angle region. The type of the adherend is not particularly limited, and is preferably any interior part in the inside of the room of a moving vehicle, for example, a dashboard, a roof trim, a sun visor, a switch panel, a decoration panel, steering, a seat, or a camera hood or lens hood such as an optical sensor.

The material constituting the pressure-sensitive adhesive layer 31, here used, can be any material known in the art and may be appropriately selected depending on the surface material (for example, a resin molded product, a multi-layered laminated product using the resin molded product, a non-woven fabric, and a skin material) of the adherend, and the type thereof is not particularly limited. For example, a rubber-based pressure-sensitive adhesive, an acrylic pressure-sensitive adhesive, an olefin-based pressure-sensitive adhesive, a silicone-based pressure-sensitive adhesive, or a urethane-based pressure-sensitive adhesive is preferably used.

The method for producing the low reflective film 100 of the present embodiment is not particularly limited as long as the above-mentioned configuration is obtained. Any conventionally known coating method such as doctor coating, dip coating, roll coating, bar coating, die coating, blade coating, air knife coating, kiss coating, spray coating, or spin coating is suitably used.

Specifically, the surface 11a of the substrate film 11 can be coated with a coating liquid containing, in a solvent, the above-mentioned binder resin 22 and organic resin particle 23, and optional components (inorganic particle 24, various additives), if necessary, compounded, and the resultant can be dried and, if necessary, subjected to a heat treatment, a pressure treatment, and/or the like, thereby forming the first resin layer 21 on the substrate film 11. In addition, the surface 11b of the substrate film 11 can be coated with a coating liquid containing a pressure-sensitive adhesive in a solvent, and the resultant can be dried and, if necessary, subjected to a heat treatment, a pressure treatment, and/or the like, thereby forming the pressure-sensitive adhesive layer 31 on the substrate film 11. An anchor treatment, a corona treatment, and/or the like can also be, if necessary, performed in order to enhance adhesiveness between the substrate film 11 and the first resin layer 21 and/or the pressure-sensitive adhesive layer 31. An intermediate layer such as a primer layer or an adhesive layer can also be, if necessary, provided between the substrate film 11 and the first resin layer 21 and/or the pressure-sensitive adhesive layer 31. After formation of a sheet once, vacuum molding, pressure molding, and/or the like can also be performed.

The solvent of the coating liquid here used can be any of, for example, water; a ketone-based solvent such as methyl ethyl ketone, methyl isobutyl ketone, or cyclohexanone; an ester-based solvent such as methyl acetate, ethyl acetate, or butyl acetate; an ether-based solvent such as methyl cellosolve or ethyl cellosolve; an alcohol-based solvent such as methyl alcohol, ethyl alcohol, or isopropyl alcohol; a nonpolar solvent such as hexane or cyclohexane; an aprotic polar solvent such as dimethylformamide; an aromatic solvent such as toluene; and a mixed solvent thereof.

Effects

In the low reflective film 100 of the present embodiment, the regular reflectance at 70 degrees and the specular gloss value of a surface (a surface of the first resin layer 21 in the present embodiment) of the first resin layer 21 of the low reflective film 100 are adjusted within respective predetermined ranges, and thus the surface reflectance and surface gloss values are small not only in a wide angle region, but also from a low angle region to a wide angle region. Accordingly, such a low reflective film 100 can be used to thereby allow a matted product low in surface reflectance and surface gloss values not only at a wide angle, but also at a low angle, to be realized. The low reflective film 100 of the present embodiment can be used as a low reflective film which covers a surface of an interior part disposed in the inside of the room of a moving vehicle to result in a reduction of reflected light of external light on the surface and an enhancement in imaging accuracy and/or detection accuracy of an optical sensor disposed in the inside of the room, thereby inhibiting an optical sensor from causing a degraded image taken and a deteriorated detection accuracy. Accordingly, the low reflective film 100 of the present embodiment can allow imaging, sensing, and the like at high accuracies to be realized in various moving vehicles such as an automobile, a railway train, a train, an electric train, ship, a cargo ship, an aircraft, a spacecraft, a rocket, transport equipment, and a vehicle.

Modified Example

While the low reflective film 100 having a three-layered laminated structure where the first resin layer 21, the substrate film 11, and the pressure-sensitive adhesive layer 31 are at least arranged in the listed order is exemplified in the first embodiment, two or more resin layers may be provided. For example, the low reflective film 200 may be adopted which has a laminated structure (four-layered structure) where the first resin layer 21, the substrate film 11, the second resin layer 41, and the pressure-sensitive adhesive layer 31 are at least arranged in the listed order, as illustrated in FIG. 2. Alternatively, a laminated structure (four-layered structure) may also be adopted where the first resin layer 21, the second resin layer 41, the substrate film 11, and the pressure-sensitive adhesive layer 31 are at least arranged in the listed order.

The second resin layer 41 here used can be a conventionally known resin layer, or can be a resin layer or light-shielding film (provided that the regular reflectance and specular gloss value thereof are not particularly limited.) having the same composition as that of the above-mentioned first resin layer 21, and the type thereof is not particularly limited. The optical density (OD) of the second resin layer 41 is not particularly limited, and is preferably 0.5 or more, more preferably 1.0 or more, further preferably 1.7 or more, particularly preferably 2.0 or more. In a case where the resin layers 21 and 31 are laminated, the optical density (OD) of the entire low reflective film 100 is preferably 1.5 to 6.0, more preferably 2.0 to 6.0, further preferably 2.3 to 6.0, particularly preferably 4.5 to 6.0, most preferably 5.0 to 6.0.

The low reflective film 300 can be adopted which has a two-layered laminated structure where the pressure-sensitive adhesive layer 31 is omitted, as illustrated in FIG. 3, or the low reflective film 400 can be adopted which has a two-layered laminated structure where the substrate film 11 is omitted, as illustrated in FIG. 4. While an example where the first resin layer 21 is provided on a flat surface (substrate film 11) is shown in the first embodiment, the first resin layer 21 can be provided on a curved surface or can be provided on an asperity surface.

The first resin layer 21 in the above-mentioned embodiment or each Modified Example can be recognized singly as an article expressed as a low reflective molded product. In other words, the first resin layer 21 in the present invention not only can be carried out as the low reflective film, but also can be carried out as a thicker low reflective molded product. The thickness of the low reflective molded product is not limited to the thickness (the thickness T of the first resin layer 21) in the mode of the above-mentioned film, and can be arbitrarily set. For example, a low reflective molded product having a thickness of 50 to 1000 μm, a low reflective molded product having a thickness of 1 to 10 mm, or a low reflective molded product having a thickness of 1 cm or more can be adopted.

EXAMPLES

Hereinafter, the present invention will be specifically described with reference to Examples and Comparative Examples, but the present invention is not limited to such Examples at all. In the present invention, various conditions can be adopted without departing from the gist of the present invention, as long as the objects of the present invention are achieved. Hereinafter, "part(s)" represents "part(s) by mass", unless particularly noted.

Example 1

One surface of a biaxially oriented PET film having a thickness of 50 μm (Toray Industries, Inc., trade name: Lumirror T60, high transparent type, total light transmittance (550 nm): 89.1%), as a substrate, was coated with the following coating liquid for a resin layer according to a bar coating method so that the thickness after drying was 8 μm, and the resultant was dried to form a first resin layer having a thickness of 8 μm on a substrate film, thereby producing low reflective film of Example 1.

<Coating Liquid for Resin Layer>

| | |
|---|---|
| Binder resin (DIC Corporation, Acrydic A807, solid content: 50% by mass) | 16.4 parts by mass |
| Organic resin particle (acrylic beads, average particle size $D_{50}$: 8 μm) | 9.0 parts by mass |
| Inorganic particle (Tokai Carbon Co., Ltd., Tokablack #5500, average particle size $D_{50}$: 25 nm) | 2.4 parts by mass |
| Resin curing agent (DIC Corporation, Burnock DN980, solid content: 75% by mass) | 2.4 parts by mass |
| Diluent solvent (mixed solvent of MEK:toluene = 50:50) | 77.0 parts by mass |

Examples 2 to 30 and Comparative Examples 1 to 9, and Example 31

Each of low reflective films of Examples 2 to 30 and Comparative Examples 1 to 9 was produced in the same manner as in Example 1 except that the type and the average particle size $D_{50}$ of the organic resin particle, use of the binder resin and the amount thereof used, the amount of the diluent solvent used, and the thickness of the resin layer were changed as shown in Tables 2 to 4. One surface of a biaxially oriented PET film having a thickness of 50 μm (Toray Industries, Inc., trade name: Lumirror T60, high transparent type, total light transmittance (550 nm): 89.1%), as a substrate, was coated with a coating liquid for a resin layer, shown in Table 4, so that the thickness after drying was 15 μm, and the resultant was dried to form a first resin layer having a thickness of 15 μm on a substrate film, thereby producing low reflective film of Example 31.

Each of the low reflective films obtained in Examples 1 to 31 and Comparative Examples 1 to 9 was subjected to measurement and evaluation of each of physical properties in the following conditions. The evaluation results are together shown in Tables 2 to 4.

(1) Thickness/Particle Size

The thickness of each of the low reflective films was calculated by division by the average particle size $D_{50}$ of the organic resin particle.

(2) Specular Gloss Value

The gloss value (specular gloss value) (%) of a surface of the first resin layer 21 at each defined incident light receiving angle (20°, 45°, 60°, 75°, 85°) was measured with a digital variable angle gloss meter (Gloss Meter VG7000: Nippon Denshoku Industries Co., Ltd.) according to JIS-Z8741: 1997.

(3) Regular Reflectance at 70 Degrees

The regular reflectance (specular reflectance) (%) of a surface of the first resin layer 21 at an incident light receiving angle 70° of light at a wavelength of 550 nm was measured with a spectrophotometer (SolidSpec-3700: Shimadzu Corporation).

(4) Optical Density OD

The optical density of the first resin layer 21 was measured with an optical densitometer (X-Rite 361T: X-Rite Inc.), based on ISO 5-2. An ortho filter was used in the measurement.

(4) Surface Roughness Ra

The surface roughness Ra (μm) of a surface of the first resin layer 21 was measured with a stylus type surface roughness measurement machine (SURFCOM 1500SD2-3DF: Tokyo Seimitsu Co., Ltd.), according to the method for measuring the arithmetic average roughness (Ra) in JIS-B0601 (2001).

(5) Luminous Reflectance Y Value

The luminous reflectance Y value of the low reflective film of Example 1 was measured based on the diffusion reflectance by use of a spectrophotometric colorimeter (for example, spectrophotometer U?4100 (manufactured by Hitachi High-Technologies Corporation)) and an integrating sphere, according to JIS Z 8701, and was 0.81%. The respective luminous reflectance Y values at incident light receiving angles (5°, 20°, 45°, 60°, 70°), based on the specular reflectance, were as follows.

5°: 0.03%
20°: 0.02%
45°: 0.04%
60°: 0.10%
70°: 0.37%

TABLE 2

| | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Binder resin | (parts by mass) | 16.4 | 16.4 | 16.4 | 16.4 | 16.4 | 16.4 | 16.4 | 16.4 | 16.4 | 16.4 | 16.4 | 16.4 | 16.4 |
| Organic resin particle | Particle size | 8 | 8 | 8 | 8 | 8 | 8 | 8 | 8 | 8 | 8 | 8 | 8 | 8 |
| | Color | Black | Black | Black | Transparent | Transparent | Transparent | Transparent | Transparent | Transparent | Transparent | Transparent | Transparent | Transparent |
| | (parts by mass) | 9.0 | 9.0 | 9.0 | 9.0 | 9.0 | 9.0 | 9.0 | 9.0 | 9.0 | 13.5 | 13.5 | 18.0 | 18.0 |
| Inorganic particle | (parts by mass) | 2.4 | 2.4 | 2.4 | 2.4 | 2.4 | 2.4 | 2.4 | 2.4 | 2.4 | 2.4 | 2.4 | 2.4 | 2.4 |
| Resin curing agent | (parts by mass) | 2.4 | 2.4 | 2.4 | 2.4 | 2.4 | 2.4 | 2.4 | 2.4 | 2.4 | 2.4 | 2.4 | 2.4 | 2.4 |

TABLE 2-continued

|  |  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Thickness | [µm] | 8 | 7 | 11 | 7 | 8 | 10 | 11 | 15 | 17 | 9 | 10 | 8 | 10 |
| Thickness/particle size |  | 1.0 | 0.9 | 1.4 | 0.9 | 1.0 | 1.3 | 1.4 | 1.9 | 2.1 | 1.1 | 1.3 | 1.0 | 1.3 |
| Solid content concentration | (%) | 20.0 | 20.0 | 20.0 | 20.0 | 20.0 | 20.0 | 20.0 | 20.0 | 20.0 | 23.2 | 23.2 | 26.2 | 26.2 |
| Specular gloss value (%) | 20° | 0.1 | 0.1 | 0.1 | 0.1 | 0.1 | 0.1 | 0.1 | 0.1 | 0.1 | 0.1 | 0.1 | 0.1 | 0.1 |
|  | 45° | 0.4 | 0.4 | 0.5 | 0.8 | 0.9 | 0.5 | 0.4 | 0.4 | 0.4 | 0.8 | 0.4 | 0.8 | 0.3 |
|  | 60° | 0.4 | 0.5 | 0.7 | 1.1 | 1.3 | 0.7 | 0.5 | 0.5 | 0.4 | 1.1 | 0.5 | 1.3 | 0.3 |
|  | 75° | 1.3 | 1.4 | 2.1 | 1.6 | 1.7 | 1.1 | 0.9 | 1.1 | 1.1 | 1.7 | 0.8 | 1.9 | 0.7 |
|  | 85° | 2.5 | 2.9 | 3.3 | 1.3 | 1.4 | 2.2 | 2.1 | 2.5 | 2.3 | 1.2 | 1.4 | 1.4 | 1.6 |
|  | Total | 4.7 | 5.3 | 6.7 | 4.9 | 5.4 | 4.6 | 4.0 | 4.6 | 4.3 | 4.9 | 3.2 | 5.5 | 3.0 |
| Regular reflectance (%) at 70° (550 nm) |  | 0.3 | 0.4 | 0.5 | 0.5 | 0.7 | 0.4 | 0.3 | 0.3 | 0.3 | 0.6 | 0.3 | 0.5 | 0.2 |
| Density (OD) |  | 2.4 | 4.2 | 5.9 | 1.1 | 1.2 | 1.5 | 1.6 | 1.9 | 2.7 | 0.9 | 1.1 | 0.8 | 1.0 |
| Ra (µm) |  | 1.2 | 1.2 | 1.2 | 1.7 | 1.3 | 1.3 | 1.4 | 1.5 | 1.7 | 1.6 | 1.6 | 1.5 | 1.6 |

TABLE 3

|  |  | Example 14 | Example 15 | Example 16 | Example 17 | Example 18 | Example 19 | Example 20 | Example 21 | Example 22 |
|---|---|---|---|---|---|---|---|---|---|---|
| Binder resin | (parts by mass) | 16.4 | 16.4 | 16.4 | 16.4 | 16.4 | 16.4 | 16.4 | 16.4 | 16.4 |
| Organic resin particle | Particle size | 11 | 11 | 11 | 11 | 11 | 11 | 11 | 11 | 11 |
|  | Color | Black | Black | Black | Black | Black | Black | Black | Black | Black |
|  | (parts by mass) | 9.0 | 9.0 | 9.0 | 9.0 | 13.5 | 13.5 | 13.5 | 13.5 | 13.5 |
| Inorganic particle | (parts by mass) | 2.4 | 2.4 | 2.4 | 2.4 | 2.4 | 2.4 | 2.4 | 2.4 | 2.4 |
| Resin curing agent | (parts by mass) | 2.4 | 2.4 | 2.4 | 2.4 | 2.4 | 2.4 | 2.4 | 2.4 | 2.4 |
| Thickness | [µm] | 12 | 15 | 16 | 17 | 15 | 16.0 | 17 | 20.0 | 21.0 |
| Thickness/particle size |  | 1.1 | 1.4 | 1.5 | 1.5 | 1.4 | 1.5 | 1.5 | 1.8 | 1.9 |
| Solid content concentration | (%) | 20.0 | 20.0 | 20.0 | 20.0 | 23.2 | 23.2 | 23.2 | 23.2 | 21.4 |
| Specular gloss value (%) | 20° | 0.1 | 0.1 | 0.1 | 0.1 | 0.1 | 0.1 | 0.1 | 0.0 | 0.0 |
|  | 45° | 1.3 | 0.6 | 0.9 | 0.6 | 0.4 | 0.3 | 0.3 | 0.2 | 0.2 |
|  | 60° | 1.9 | 0.8 | 1.2 | 0.7 | 0.5 | 0.4 | 0.2 | 0.2 | 0.2 |
|  | 75° | 3.1 | 1.1 | 2.0 | 1.1 | 0.7 | 0.7 | 0.7 | 0.7 | 0.8 |
|  | 85° | 0.9 | 1.2 | 0.9 | 1.3 | 1.1 | 1.2 | 1.5 | 1.4 | 1.7 |
|  | Total | 7.3 | 3.8 | 5.1 | 3.8 | 2.8 | 2.7 | 2.8 | 2.5 | 2.9 |
| Regular reflectance (%) at 70° (550 nm) |  | 0.9 | 0.4 | 0.7 | 0.4 | 0.2 | 0.3 | 0.2 | 0.2 | 0.2 |
| Density (OD) |  | 2.3 | 3.0 | 2.3 | 3.2 | 2.4 | 2.6 | 3.1 | 3.2 | 3.4 |
| Ra (µm) |  | 2.0 | 2.1 | 2.1 | 2.2 | 2.5 | 2.6 | 2.2 | 2.6 | 2.5 |

|  |  | Example 23 | Example 24 | Example 25 | Example 26 | Example 27 | Example 28 | Example 29 | Example 30 |
|---|---|---|---|---|---|---|---|---|---|
| Binder resin | (parts by mass) | 16.4 | 16.4 | 16.4 | 16.4 | 16.4 | 16.4 | 16.4 | 16.4 |
| Organic resin particle | Particle size | 11 | 11 | 11 | 11 | 11 | 11 | 11 | 11 |
|  | Color | Black | Black | Black | Black | Black | Black | Black | Black |
|  | (parts by mass) | 13.5 | 18.0 | 18.0 | 20.3 | 20.3 | 20.3 | 20.3 | 20.3 |
| Inorganic particle | (parts by mass) | 2.4 | 2.4 | 2.4 | 2.4 | 2.4 | 2.4 | 2.4 | 2.4 |
| Resin curing agent | (parts by mass) | 2.4 | 2.4 | 2.4 | 3.6 | 3.6 | 3.6 | 3.6 | 3.6 |

TABLE 3-continued

| | | | | | | | | | |
|---|---|---|---|---|---|---|---|---|---|
| Thickness | [μm] | 22.0 | 15 | 16 | 17.0 | 18.0 | 19.0 | 20.0 | 21.0 |
| Thickness/particle size | | 2.0 | 1.4 | 1.5 | 1.5 | 1.6 | 1.7 | 1.8 | 1.9 |
| Solid content concentration | (%) | 25.7 | 26.2 | 26.2 | 25.7 | 25.7 | 23.2 | 25.7 | 25.7 |
| Specular gloss value (%) | 20° | 0.0 | 0.1 | 0.1 | 0.1 | 0.1 | 0.1 | 0.0 | 0.0 |
| | 45° | 0.2 | 0.4 | 0.4 | 0.3 | 0.3 | 0.3 | 0.2 | 0.2 |
| | 60° | 0.2 | 0.4 | 0.4 | 0.3 | 0.3 | 0.2 | 0.2 | 0.2 |
| | 75° | 0.7 | 0.7 | 0.7 | 0.7 | 0.7 | 0.7 | 0.7 | 0.6 |
| | 85° | 1.3 | 1.2 | 1.0 | 1.2 | 1.2 | 1.4 | 1.3 | 1.3 |
| | Total | 2.4 | 2.8 | 2.6 | 2.6 | 2.6 | 2.7 | 2.4 | 2.3 |
| Regular reflectance (%) at 70° (550 nm) | | 0.2 | 0.2 | 0.2 | 0.2 | 0.2 | 0.2 | 0.2 | 0.2 |
| Density (OD) | | 3.6 | 2.5 | 2.0 | 2.3 | 2.5 | 3.0 | 3.0 | 3.2 |
| Ra (μm) | | 2.9 | 2.3 | 2.3 | 2.5 | 2.4 | 2.6 | 2.6 | 2.7 |

TABLE 4

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Example 31 |
|---|---|---|---|---|---|---|---|---|---|---|---|
| Binder resin | (parts by mass) | 16.4 | 16.4 | 16.4 | 16.4 | 16.4 | 16.4 | 16.4 | 16.4 | 16.4 | 16.4 |
| Organic resin particle | Particle size | 3 | 3 | 3 | 11 | 11 | 11 | 8 | 8 | 8 | 4 |
| | Color | Black | Black | Black | Black | Black | Black | Transparent | Transparent | Transparent | Black |
| | (parts by mass) | 9.0 | 9.0 | 9.0 | 4.5 | 4.5 | 4.5 | 4.5 | 4.5 | 4.5 | 9.0 |
| Inorganic particle | (parts by mass) | 2.4 | 2.4 | 2.4 | 2.4 | 2.4 | 2.4 | 2.4 | 2.4 | 2.4 | 2.4 |
| Resin curing agent | (parts by mass) | 2.4 | 2.4 | 2.4 | 2.4 | 2.4 | 2.4 | 2.4 | 2.4 | 2.4 | 2.4 |
| Thickness | [μm] | 5 | 8 | 11 | 14 | 14 | 15 | 10 | 12 | 12 | 15 |
| Thickness/particle size | | 1.7 | 2.6 | 3.6 | 1.3 | 1.3 | 1.4 | 1.3 | 1.5 | 1.5 | 3.8 |
| Solid content concentration | (%) | 20.0 | 20.0 | 20.0 | 16.5 | 16.5 | 16.5 | 16.5 | 16.5 | 16.5 | 20.0 |
| Specular gloss value (%) | 20° | 0.1 | 0.1 | 0.1 | 0.3 | 0.3 | 0.3 | 0.2 | 0.1 | 0.1 | 0.1 |
| | 45° | 0.4 | 0.5 | 0.6 | 3.0 | 2.4 | 2.2 | 1.3 | 1.1 | 1.0 | 0.4 |
| | 60° | 0.6 | 0.6 | 0.9 | 4.7 | 3.8 | 3.3 | 2.0 | 1.6 | 1.5 | 0.5 |
| | 75° | 2.6 | 2.9 | 4.0 | 7.6 | 6.6 | 5.4 | 3.5 | 2.9 | 3.0 | 1.3 |
| | 85° | 11.6 | 11.9 | 12.5 | 1.1 | 1.3 | 1.4 | 1.8 | 2.1 | 2.5 | 1.4 |
| | Total | 15.3 | 16.0 | 18.1 | 16.7 | 14.4 | 12.6 | 8.8 | 7.8 | 8.1 | 3.7 |
| Regular reflectance (%) at 70° (550 nm) | | 0.5 | 0.6 | 0.7 | 2.3 | 1.9 | 1.6 | 1.2 | 1.0 | 0.8 | 0.4 |
| Density (OD) | | 2.7 | 5.1 | 6.0 | 3.0 | 3.5 | 3.9 | 1.9 | 2.3 | 2.8 | 3.0 |
| Ra (μm) | | 0.6 | 0.6 | 0.7 | 1.9 | 1.7 | 1.7 | 1.2 | 1.3 | 1.2 | 2.6 |

INDUSTRIAL APPLICABILITY

The present invention can be widely and effectively utilized as a high-performance low reflective film in, for example, the precision machinery field, the semiconductor field, the optical equipment field, and the electronic equipment field. For example, the present invention can be widely and effectively utilized as a low reflective film for use in, for example, a lens unit, a camera module, or a sensor unit mounted on, for example, a high-performance single-lens reflex camera, a compact camera, a video camera, a mobile phone, a projector, an in-vehicle camera, an in-vehicle sensor, or an optical sensor, and in particular, can be especially effectively utilized as a low reflective film for an interior part of a moving vehicle, for example, a dashboard, a roof trim, a sun visor, a switch panel, a decoration panel, steering, a seat, or a camera hood or lens hood such as an optical sensor.

REFERENCE SIGNS LIST

11 . . . substrate (substrate film)
11a . . . surface
11b . . . surface
21 . . . first resin layer
22 . . . binder resin
23 . . . organic resin particle
24 . . . inorganic particle
31 . . . pressure-sensitive adhesive layer
41 . . . second resin layer
T . . . thickness of first resin layer t . . . average particle size of organic resin particle
100 . . . low reflective film
200 . . . low reflective film
300 . . . low reflective film
400 . . . low reflective film

The invention claimed is:

1. A low reflective film comprising at least a first resin layer, wherein
   the first resin layer comprises at least a binder resin, and organic resin particles having an average particle size $D_{50}$ of 2 to 20 μm, and
   a surface of the first resin layer has a reflectance and gloss values satisfying the following relationships;
   (1) regular reflectance at 70 degrees: 0.0% or more and 2.5% or less at a wavelength of 550 nm,
   (2) specular gloss value at 60 degrees: 0.0% or more and 6.0% or less,
   specular gloss value at 75 degrees: 0.0% or more and 6.0% or less,
   specular gloss value at 85 degrees: 0.0% or more and 6.0% or less, and
   (3) a sum of a specular gloss value at 20°, a specular gloss value at 45°, the specular gloss value at 60°, the specular gloss value at 75°, and the specular gloss value at 85° is 7.5% or less.

2. The low reflective film according to claim 1, wherein the organic resin particles have an average particle size $D_{50}$ of 5 to 20 μm.

3. The low reflective film according to claim 1, wherein a content rate of the organic resin particles to the binder resin is 0.6 to 2.5.

4. The low reflective film according to claim 1, wherein the first resin layer has a thickness T of 0.5 to 8.0 times of an average particle size $D_{50}$ of the organic resin particles comprised in the first resin layer.

5. The low reflective film according to claim 1, having an optical density of 0.5 or more.

6. The low reflective film according to claim 1, wherein the first resin layer further comprises carbon black.

7. The low reflective film according to claim 1, having a laminated structure comprising at least the first resin layer and a pressure-sensitive adhesive layer in the listed order.

8. The low reflective film according to claim 1, having a laminated structure comprising at least the first resin layer and a substrate film in the listed order.

9. The low reflective film according to claim 1, having a laminated structure comprising at least the first resin layer, a substrate film, and a pressure-sensitive adhesive layer in the listed order.

10. The low reflective film according to claim 1, having a laminated structure comprising at least the first resin layer, a substrate film, a second resin layer, and a pressure-sensitive adhesive layer in the listed order.

11. The low reflective film according to claim 7, wherein the pressure-sensitive adhesive layer comprises one or more pressure-sensitive adhesives selected from the group consisting of a rubber-based pressure-sensitive adhesive, an acrylic pressure-sensitive adhesive, an olefin-based pressure-sensitive adhesive, a silicone-based pressure-sensitive adhesive, and a urethane-based pressure-sensitive adhesive.

12. The low reflective film according to claim 1, wherein the first resin layer has a surface roughness Ra of 0.8 to 4.0 μm.

13. An optical sensing kit comprising at least
    an optical sensor which is disposed in an inside of a room of a moving vehicle and which images an outside of the room of the moving vehicle or detects visible light or infrared light in the outside of the room through a window transparent to visible light or infrared light, and
    a low reflective film which covers a surface of an interior part disposed in the inside of the room and which reduces reflected light of external light on the surface to thereby allow the optical sensor to be enhanced in imaging accuracy and/or detection accuracy, wherein
    the low reflective film comprises at least
    a first resin layer, in which
    the first resin layer comprises at least a binder resin, and organic resin particles having an average particle size $D_{50}$ of 2 to 20 μm, and
    a surface of the first resin layer has a reflectance and gloss values satisfying the following relationships;
    (1) regular reflectance at 70 degrees: 0.0% or more and 2.5% or less at a wavelength of 550 nm,
    (2) specular gloss value at 60 degrees: 0.0% or more and 6.0% or less,
    specular gloss value at 75 degrees: 0.0% or more and 6.0% or less,
    specular gloss value at 85 degrees: 0.0% or more and 6.0% or less, and
    (3) a sum of a specular gloss value at 20°, a specular gloss value at 45°, the specular gloss value at 60°, the specular gloss value at 75°, and the specular gloss value at 85° is 7.5% or less.

14. The optical sensing kit according to claim 13, wherein the organic resin particles have an average particle size $D_{50}$ of 5 to 20 μm.

15. The optical sensing kit according to claim 13, wherein the interior part corresponds to one or more selected from the group consisting of a resin molded product, a multi-layered laminated product using the resin molded product, a non-woven fabric, and a skin material.

16. A low reflective molded product which covers a surface of an article, wherein
    the low reflective molded product comprises at least a binder resin, and organic resin particles having an average particle size $D_{50}$ of 2 to 20 μm, and at least one surface of the low reflective molded product has a reflectance and gloss values satisfying the following relationships;
    (1) regular reflectance at 70 degrees: 0.0% or more and 2.5% or less at a wavelength of 550 nm,
    (2) specular gloss value at 60 degrees: 0.0% or more and 6.0% or less,
    specular gloss value at 75 degrees: 0.0% or more and 6.0% or less,
    specular gloss value at 85 degrees: 0.0% or more and 6.0% or less, and
    (3) a sum of a specular gloss value at 20°, a specular gloss value at 45°, the specular gloss value at 60°, the specular gloss value at 75°, and the specular gloss value at 85° is 7.5% or less.

* * * * *